US012719153B2

(12) United States Patent
Seo et al.

(10) Patent No.: US 12,719,153 B2
(45) Date of Patent: Aug. 25, 2026

(54) ANTENNA AND ELECTRONIC DEVICE COMPRISING SAME

(71) Applicant: Samsung Electronics Co., Ltd., Suwon-si (KR)

(72) Inventors: Mincheol Seo, Suwon-si (KR); Hoonsang Yoo, Suwon-si (KR); Sunghyup Lee, Suwon-si (KR); Woosuk Kang, Suwon-si (KR); Yunsik Kim, Suwon-si (KR); Changha Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/628,014

(22) Filed: Apr. 5, 2024

(65) Prior Publication Data

US 2024/0250412 A1 Jul. 25, 2024

Related U.S. Application Data

(63) Continuation of application No. PCT/KR2022/014407, filed on Sep. 27, 2022.

(30) Foreign Application Priority Data

Oct. 6, 2021 (KR) ........................ 10-2021-0132227

(51) Int. Cl.
*H01Q 1/24* (2006.01)
*H01Q 1/50* (2006.01)

(52) U.S. Cl.
CPC ............... *H01Q 1/243* (2013.01); *H01Q 1/50* (2013.01)

(58) Field of Classification Search
None
See application file for complete search history.

(56) References Cited

U.S. PATENT DOCUMENTS 8,766,859 B2 7/2014 Merz et al.
2014/0001022 A1 1/2014 Weber et al.
(Continued)

FOREIGN PATENT DOCUMENTS

CN 202713411 U 1/2013
CN 208970396 U 6/2019
(Continued)

OTHER PUBLICATIONS

Extended European Search Report dated Dec. 2, 2024 issued in European Patent Application No. 22878798.2.
(Continued)

*Primary Examiner* — Crystal L Hammond
(74) *Attorney, Agent, or Firm* — Nixon & Vanderhye P.C.

(57) ABSTRACT

An electronic device according to various embodiments may comprise: a housing comprising a conductive portion; at least one electronic part arranged in an internal space of the housing; a slot formed to have a designated length on the conductive portion, within a specified distance of the at least one electronic part; an electric connection structure arranged to correspond to the slot at least partially, and electrically connects the at least one electronic part and a device substrate arranged in the internal space; a conductive contact for electrically connecting the electric connection structure and the conductive portion, using a method of crossing the slot; and a wireless communication circuit arranged on the device substrate and configured to transmit and/or receive a wireless signal in a designated frequency band, via the slot and at least a portion of the conductive portion.

20 Claims, 13 Drawing Sheets

(56) References Cited

U.S. PATENT DOCUMENTS

| | | | | |
|---|---|---|---|---|
| 2014/0210675 | A1* | 7/2014 | Hwang | H01Q 1/44 343/702 |
| 2014/0367237 | A1 | 12/2014 | Taylor | |
| 2016/0233037 | A1 | 8/2016 | Lee et al. | |
| 2016/0301126 | A1 | 10/2016 | Hwang et al. | |
| 2017/0033812 | A1 | 2/2017 | Son et al. | |
| 2017/0373376 | A1 | 12/2017 | Jo et al. | |
| 2018/0183912 | A1 | 6/2018 | Lim et al. | |
| 2018/0342793 | A1 | 11/2018 | Lee et al. | |
| 2019/0058244 | A1 | 2/2019 | Kim et al. | |
| 2019/0312960 | A1 | 10/2019 | Hwang et al. | |
| 2021/0098869 | A1 | 4/2021 | Ruaro et al. | |
| 2022/0069443 | A1 | 3/2022 | Jeon et al. | |

FOREIGN PATENT DOCUMENTS

| | | | |
|---|---|---|---|
| CN | 112018502 | A | 12/2020 |
| CN | 112332092 | A | 2/2021 |
| EP | 3 656 111 | A1 | 5/2020 |
| KR | 10-2014-0097849 | A | 8/2014 |
| KR | 20160020497 | A | 2/2016 |
| KR | 20160097107 | A | 8/2016 |
| KR | 20170013682 | A | 2/2017 |
| KR | 101759950 | B1 | 7/2017 |
| KR | 20180073115 | A | 7/2018 |
| KR | 20190116884 | A | 10/2019 |
| KR | 20200092719 | A | 8/2020 |
| KR | 20220098598 | A | 7/2022 |
| WO | WO 2020/153694 | A1 | 7/2020 |

OTHER PUBLICATIONS

International Search Report for PCT/KR2022/014407 mailed Jan. 2, 2023, 6 pages.
India Notice of Hearing dated Mar. 27, 2026 for IN Application No. 202417028231.
Indian First Examination Report dated Dec. 4, 2025 issued in Indian Patent Application No. 202417028231, 7 pp.
Korean Office Action dated Dec. 17, 2025 issued in Korean Patent Application No. 10-2021-0132227 and English translation, 9 pp.

* cited by examiner

ANTENNA AND ELECTRONIC DEVICE COMPRISING SAME

CROSS-REFERENCE TO RELATED APPLICATIONS

This application is a continuation of International Application No. PCT/KR2022/014407 designating the United States, filed on Sep. 27, 2022, in the Korean Intellectual Property Receiving Office and claiming priority to Korean Patent Application No. 10-2021-0132227, filed on Oct. 6, 2021, in the Korean Intellectual Property Office, the disclosures of each of which are incorporated by reference herein in their entireties.

BACKGROUND

Field

Embodiments of the disclosure relate to an antenna and an electronic device including the same.

Description of Related Art

In order to secure competitiveness with other manufacturers, electronic devices are gradually becoming slimmer, and are being developed to increase rigidity, enhance design aspects, and differentiate functional elements thereof.

In order to help slim an electronic device, it is necessary for a plurality of electronic components (e.g., the antenna structures) disposed in the inner space of an electronic device to be disposed in a space-efficient manner with respect to each other. When the functions of the electronic components are not properly exhibited or the rigidity of the electronic device is impaired even if the plurality of electronic components are disposed in the inner space of the electronic device in the space-efficient manner, the quality of the electronic device may be deteriorated. Therefore, it is necessary to develop the electronic components to satisfy the above-mentioned conditions.

An electronic device such as a mobile terminal, a mobile communication terminal, or a smartphone may communicate with an external electronic device via a wireless communication circuit and at least one antenna. The electronic device may include a plurality of antennas (e.g., antenna structures) so that different wireless communication functions can be provided in various frequency bands. These antennas may include a legacy antenna operating in a frequency band ranging from about 600 MHz to 6,000 MHz or a next-generation antenna such as a 5G antenna operating in a frequency band ranging from about 3 GHz to 100 GHz.

In order to reinforce the rigidity of the electronic device, a housing made of a conductive material may be used, and the electronic device may include an antenna that uses a conductive portion split through at least one split portion as a radiator. The at least one split portion may deteriorate the rigidity of the electronic device. Accordingly, the electronic device may include a slot antenna using a long slot provided in at least a portion of the conductive portion in the inner space. The slot antenna may operate in a frequency band predetermined based on the length of the slot.

However, as electronic devices gradually become slimmer and the arrangement density of peripheral electronic components increases, it may be difficult to increase the physical lengths of slots to operate in a predetermined frequency band. In addition, in order to ensure electrical connection, it is necessary to extend a device substrate to the periphery of a slot, which may make it difficult to place electronic components.

SUMMARY

Embodiments of the disclosure may provide an antenna capable of operating in a predetermined frequency band even when the physical length extension of the slot is reduced, and an electronic device including the antenna.

Embodiments of the disclosure may provide an antenna capable of helping reinforce the rigidity of an electronic device by reducing the extension of the physical length of a slot, and an electronic device including the antenna.

According to various example embodiments, an electronic device may include: a housing including a front surface cover, a rear surface cover facing away from the front surface cover, and a side surface surrounding the space between the front surface cover and the rear surface cover and at least partially including a conductive portion, at least one electronic component disposed to be connected to the space of the housing from the outside through an opening provided in the conductive portion, a slot at least partially connected to the opening in the conductive portion and having a specified length, an electrical connection structure comprising a conductor disposed to at least partially correspond to the slot and electrically connecting the at least one electronic component to a device substrate disposed in the space, a conductive contact electrically connecting the electrical connection structure to the conductive portion by crossing the slot, and a wireless communication circuit disposed on the device substrate and configured to transmit and/or receive a wireless signal in a specified frequency band through at least a portion of the conductive portion and the slot.

According to various example embodiments, an electronic device may include: a housing at least partially including a conductive portion, at least one electronic component disposed in an inner space of the housing, a slot having a specified length provided in the conductive portion adjacent to the at least one electronic component, an electrical connection structure comprising a conductor disposed to at least partially correspond to the slot and electrically connecting the at least one electronic component to a device substrate disposed in the inner space, a conductive contact electrically connecting the electrical connection structure to the conductive portion by crossing the slot, and a wireless communication circuit disposed on the device substrate and configured to transmit and/or receive a wireless signal in a specified frequency band through at least a portion of the conductive portion and the slot.

In an electronic device according to various example embodiments of the disclosure, a substrate connecting peripheral electronic components (e.g., at least one key button module) to a device substrate (a printed circuit board (PCB)) is disposed to correspond to a slot and is also used as an electrical connection component for the antenna. Therefore, even when the length of the slot is not extended due to the coupling generated between the substrate and the slot, the physical extension of the slot is reduced by inducing the slot to operate in a predetermined frequency band, which is capable of helping reinforce the rigidity of the electronic device and design the efficient arrangement of electronic components.

Various other effects identified directly or indirectly through this disclosure can be provided.

BRIEF DESCRIPTION OF THE DRAWINGS

The above and other aspects, features and advantages of certain embodiments of the present disclosure will be more apparent from the following detailed description, taken in conjunction with the accompanying drawings. In connection with the description of the drawings, the same or similar components may be denoted by the same or similar reference numerals.

DETAILED DESCRIPTION

Figure 1:
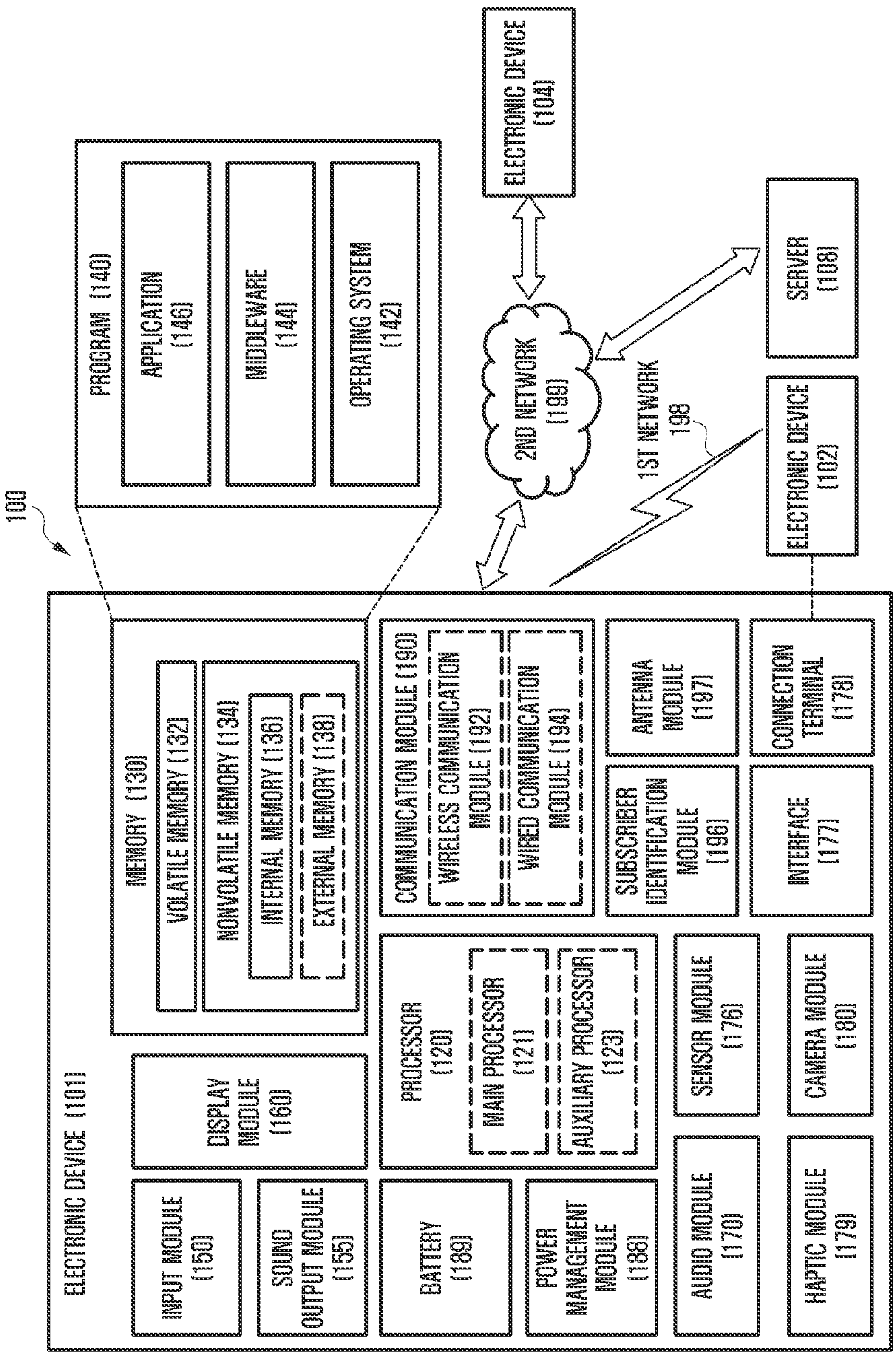
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
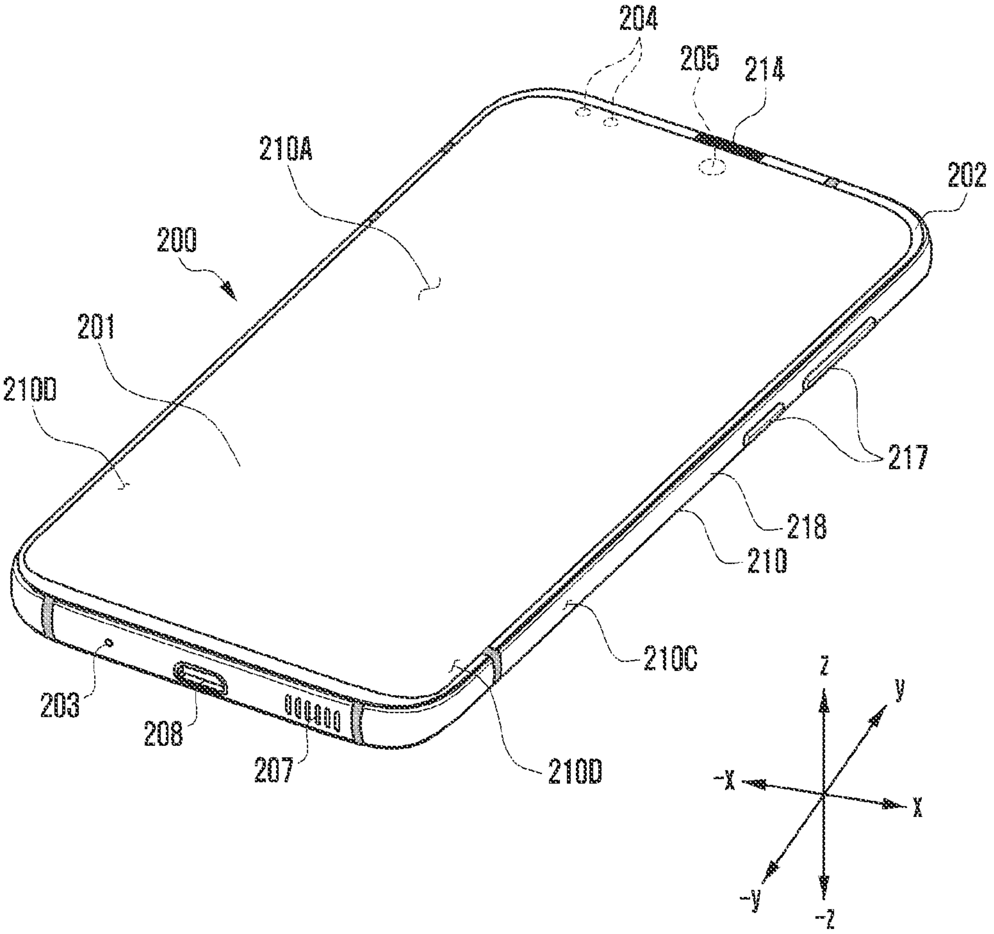
FIG. 2A is a front perspective view of the electronic device according to various embodiments.
Figure 2B:
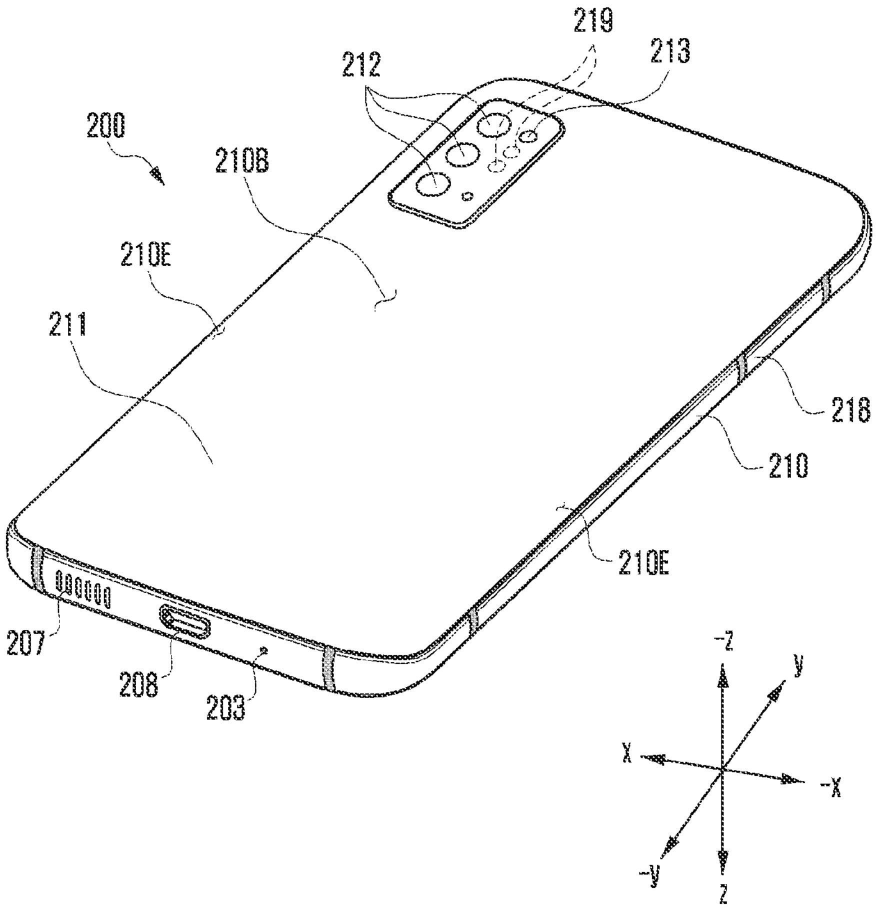
FIG. 2B is a rear perspective view of the electronic device according to various embodiments.

FIG. 2A is a front perspective view of an electronic device 200 according to various embodiments, and FIG. 2B is a rear perspective view of a rear surface of the electronic device 200 shown in FIG. 2A according to various embodiments.

The electronic device 200 in FIGS. 2A and 2B may be at least partially similar to the electronic device 101 in FIG. 1 or may further include other embodiments.

Referring to FIGS. 2A and 2B, the electronic device 200 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

The electronic device 200 may include at least one of a display 201, audio modules 203, 207 and 214, sensor modules 204 and 219, camera modules 205, 212 and 213, a key input device 217, a light emitting device, and connector holes 208 and 209. The electronic device 200 may omit at least one (e.g., the key input device 217 or the light emitting device) of the above components, or may further include other components.

The display 201 may be visible through a substantial portion of the front plate 202, for example. At least a part of the display 201 may be visible through the front plate 202 that forms the first surface 210A and the first region 210D of the lateral surface 210C. The display201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E.

According to certain embodiments, the input device 203 may include at least one microphone. In certain embodiments, the input device 203 may include a plurality of microphones disposed to detect the direction of a sound. According to an embodiment, the sound output devices 201 and 202 may include speakers. According to an embodiment, the input device 203 may include a receiver for calls disposed in the first housing 210, and a speaker. In certain embodiments, the input device 203, the sound output devices 201 and 202, and the connector port 207 may be disposed in a space arranged in the first housing 210 and/or the second housing 220 of the electronic device 200, and may be exposed to the external environment through at least one hole formed in the first housing 210 and/or the second housing 220. In certain embodiments, the sound output devices 201 and 202 may include a speaker (e.g., piezo speaker) that operates without using a hole formed in the first housing 210 and/or the second housing 220.

The sensor modules 204 and 219 may generate electrical signals or data corresponding to an internal operating state of the electronic device 200 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205, 212 and 213 may include a first camera device 205 disposed on the first surface 210A of the electronic device 200, and a second camera device 212 and/or a flash 213 disposed on the second surface 210B. The camera module 205 or the camera module 212 may include one or more lenses, an image sensor, and/or an image signal processor. The flash 213 may include, for example, a light emitting diode or a xenon lamp. Two or more lenses (infrared cameras, wide angle and telephoto lenses) and image sensors may be disposed on one side of the electronic device 200.

The key input device 217 may be disposed on the lateral surface 210C of the housing 210. The electronic device 200 may not include some or all of the key input device 217 described above, and the key input device 217 which is not included may be implemented in another form such as a soft key on the display 201. The key input device 217 may include the sensor module disposed on the second surface 210B of the housing 210.

The Indicator may be disposed on the first surface 210A of the housing 210. For example, the indicator may provide status information of the electronic device 200 in an optical form. The indicator may provide a light source associated with the operation of the camera module 205. The indicator may include, for example, a light emitting diode (LED), an IR LED, or a xenon lamp.

The connector hole 208 may include a first connector hole 208 adapted for a connector (e.g., a USB connector) for transmitting and receiving power and/or data to and from an external electronic device, and/or a second connector hole adapted for a connector (e.g., an earphone jack) for transmitting and receiving an audio signal to and from an external electronic device.

Some sensor modules 205 of camera modules 205 and 212, some sensor modules 204 of sensor modules 204 and 219, or an indicator may be arranged to be exposed through a display 201. For example, the camera module 205, the sensor module 204, or the indicator may be arranged in the internal space of an electronic device 200 so as to be brought into contact with an external environment through an opening of the display 201, which is perforated up to a front plate 202. According to an embodiment, an area corresponding to some camera module 105 of the display 201 is a part of an area in which content is displayed, and may be formed as a transmission area having designated transmittance. For example, the transmission area may be formed to have transmittance having a range of about 5% to about 20%. The transmission area may include an area overlapped with a valid area (e.g., a field of view (FOV)) of the camera module 105 through which light imaged by an image sensor and for generating an image passes. For example, a transmission area of the display 201 may include an area in which the density of pixels and/or a wiring density are lower than that of surroundings. The camera module 205 may include, for example, under display camera (UDC). In an embodiment, some sensor modules 204 may be arranged to perform their functions without being visually exposed through the front plate 202 in the internal space of the electronic device. For example, in this case, an area of the display201 facing the sensor module may not require a perforated opening.

Figure 3:
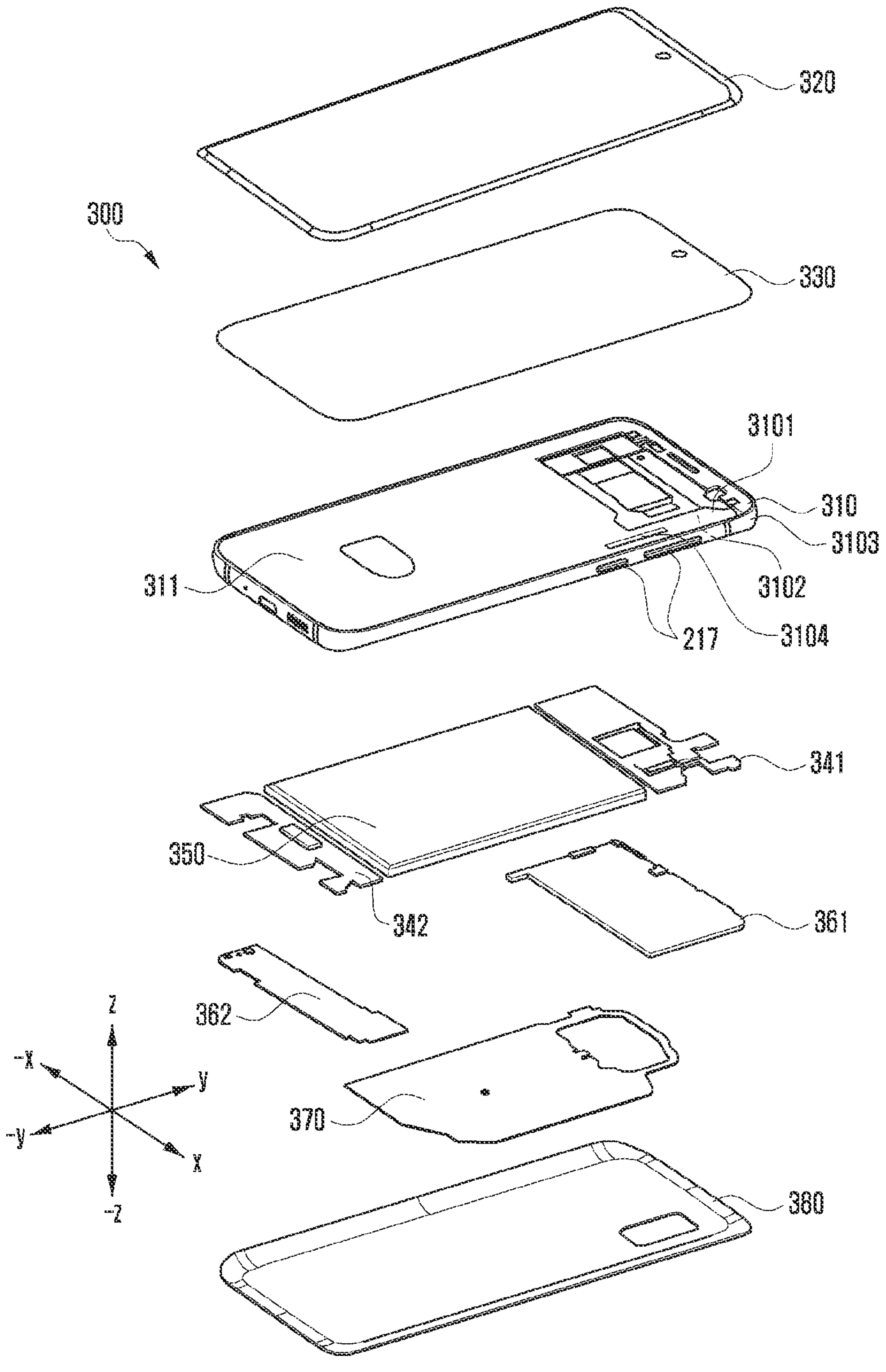
FIG. 3 is an exploded perspective view of the electronic device according to various embodiments.

FIG. 3 is an exploded perspective view of the electronic device according to various embodiments.

The electronic device 300 of FIG. 3 may be at least partially similar to the electronic device 101 of FIGS. 1 and/or the electronic device 200 of FIG. 3, or may include other embodiments of an electronic device.

Referring to FIG. 3, the electronic device 300 (e.g., the electronic device 101 in FIG. 1 or the electronic device 200 in FIG. 2) may include a lateral member 310 (e.g., the side surface bezel structure 218 in FIG. 2A), a support member 311 (e.g., a bracket or a support structure), a front surface cover 320 (e.g., the front plate 202 or the first plate in FIG. 2A), a display 330 (e.g., the display 201 in FIG. 2A), one or more substrates 341 and 342 (e.g., a printed circuit board (PCB), a flexible PCB (FPCB), or a rigid-flexible PCB (R-FPCB)), a battery 350, one or more additional support members 361 and 362 (e.g., a rear case or a rear bracket), an antenna 370, and/or a rear surface cover 380 (e.g., the rear surface plate 211 or the second plate in FIG. 2). In various embodiments, in the electronic device 300, at least one of the components (e.g., the support member 311 or one or more additional support members 361 and 362) may be omitted, or other components may be additionally included. At least one of the components of the electronic device 300 may be the same as or similar to at least one of the components of the electronic device 100 in FIG. 1 or the electronic device 200 in FIG. 2A, and a redundant description may be omitted below.

According to various embodiments, the lateral member 310 may include a first surface 3101 oriented in a first direction (e.g., the z-axis direction), a second surface 3102 facing away from the first surface 3101, and a side surface 3103 surrounding the space between the first surface 3101 and the second surface 3102. According to an embodiment, at least a portion of the side surface 3103 may define the exterior of the electronic device. According to an embodiment, the support member 311 may be disposed to extend from the lateral member 310 toward the inner space (e.g., the inner space 4001 in FIG. 4A) of the electronic device 300. In various embodiments, the support member 311 may be disposed separately from the lateral member 310. According to an embodiment, the lateral member 310 and/or the support member 311 may be made of, for example, a metal material and/or a non-metal material (e.g., polymer). According to an embodiment, the support member 311 may support at least a portion of the display 330 via the first surface 3101, and may be disposed to support at least a portion of the one or more substrates 341 and 342 and/or a battery 350 via the second surface 3102. According to an embodiment, the one or more substrates 341 and 342 may include a first substrate 341 (e.g., a main substrate) disposed at one side in the inner space (e.g., the inner space 4001 in FIG. 4A) of the electronic device 300 with respect to the battery 350, and a second substrate 342 (e.g., a sub-circuit board) disposed on at the other side. According to an embodiment, the first substrate 341 and/or the second substrate 342 may include a processor, memory, and/or an interface. According to an embodiment, the processor may include one or more of, for example, a central processing device, an application processor, a graphics processor, an image signal processor, a sensor hub processor, or a communication processor. According to an embodiment, the memory may include, for example, volatile memory or nonvolatile memory. According to an embodiment, the interface may include, for example, a high-definition multimedia interface (HDMI), a universal serial bus (USB) interface, an SD card interface, and/or an audio interface. The interface may electrically or physically connect, for example, the electronic device 300 to an external electronic device and may include a USB connector, an SD card/MMC connector, or an audio connector. According to an embodiment, the battery 350 is a device configured to supply power to at least one component of the electronic device 300 and may include, for example, a non-rechargeable primary battery, a rechargeable secondary battery, or a fuel cell. At least a portion of the battery 350 may be disposed on substantially the same plane as, for example, the one or more circuit boards 341 and 342. According to an embodiment, the battery 350 may be disposed in a manner of being embedded in the electronic device 300. In various embodiments, the battery 350 may be disposed to be detachable from the electronic device 300.

According to various embodiments, the antenna 370 may be disposed between the rear surface cover 380 and the battery 350. According to an embodiment, the antenna 370 may include, for example, a near-field communication (NFC) antenna, a wireless charging antenna, and/or a magnetic secure transmission (MST) antenna. For example, the antenna 370 may execute short-range communication with an external device or may transmit/receive power required for charging to/from an external device in a wireless manner. In various embodiments, an antenna may be configured by a portion of the lateral member 310 and/or the support member 311, or a combination thereof. In various embodiments, the electronic device 300 may further include a digitizer configured to detect an external electronic pen.

According to an example embodiment of the disclosure, the electronic device 300 may include a long slot 3104 (e.g., the slot 427 in FIG. 4A) provided in a conductive portion of the support member 311. According to an embodiment, the slot 3104 may be located around a key input device 217 (e.g., at least one key button (e.g., the key buttons 451 and 452 in FIG. 4B)). According to an embodiment, the electronic device 300 may include an electrical connection structure (e.g., the electrical connection structure 440 in FIG. 4B) configured to electrically connect the key input device 217 to the first substrate 341. According to an embodiment, the electronic device 300 may include a slot antenna (e.g., the slot antenna A in FIG. 4A) configured to operate in at least one frequency band through the slot 3104 when a wireless communication circuit (e.g., the wireless communication circuit 435 in FIG. 5B) disposed on the first substrate 341 is connected across the slot 3104 via the electrical connection structure.

According to an example embodiment of the disclosure, the slot antenna (e.g., the slot antenna A in FIG. 4A) may be configured to operate in a frequency band lower than a frequency band corresponding to the electrical length of the slot 3104 via coupling (e.g., through parasitic components) with the substrate (e.g., the substrate 441 in FIG. 4B) of the electrical connection structure disposed to correspond to the slot 3104. Accordingly, the slot 3104 may help reinforce the rigidity of the electronic device 300 by being configured to be shorter than the physical length corresponding to the operating frequency band of the antenna.

According to example embodiments of the disclosure, since the slot 3104 is electrically connected to the first substrate 341 (e.g., the device substrate 430 in FIG. 4A) through an electrical connection structure (e.g., the electrical connection structure 440 in FIG. 4B), it is not necessary to unduly expand the first substrate 341 around the slot 3104 for electrical connection, which may be helpful in designing the efficient arrangement of peripheral electronic components.

Hereinafter, the arrangement structure of peripheral electronic components (e.g., at least one key button) and a slot antenna will be described in greater detail.

Figure 4A:
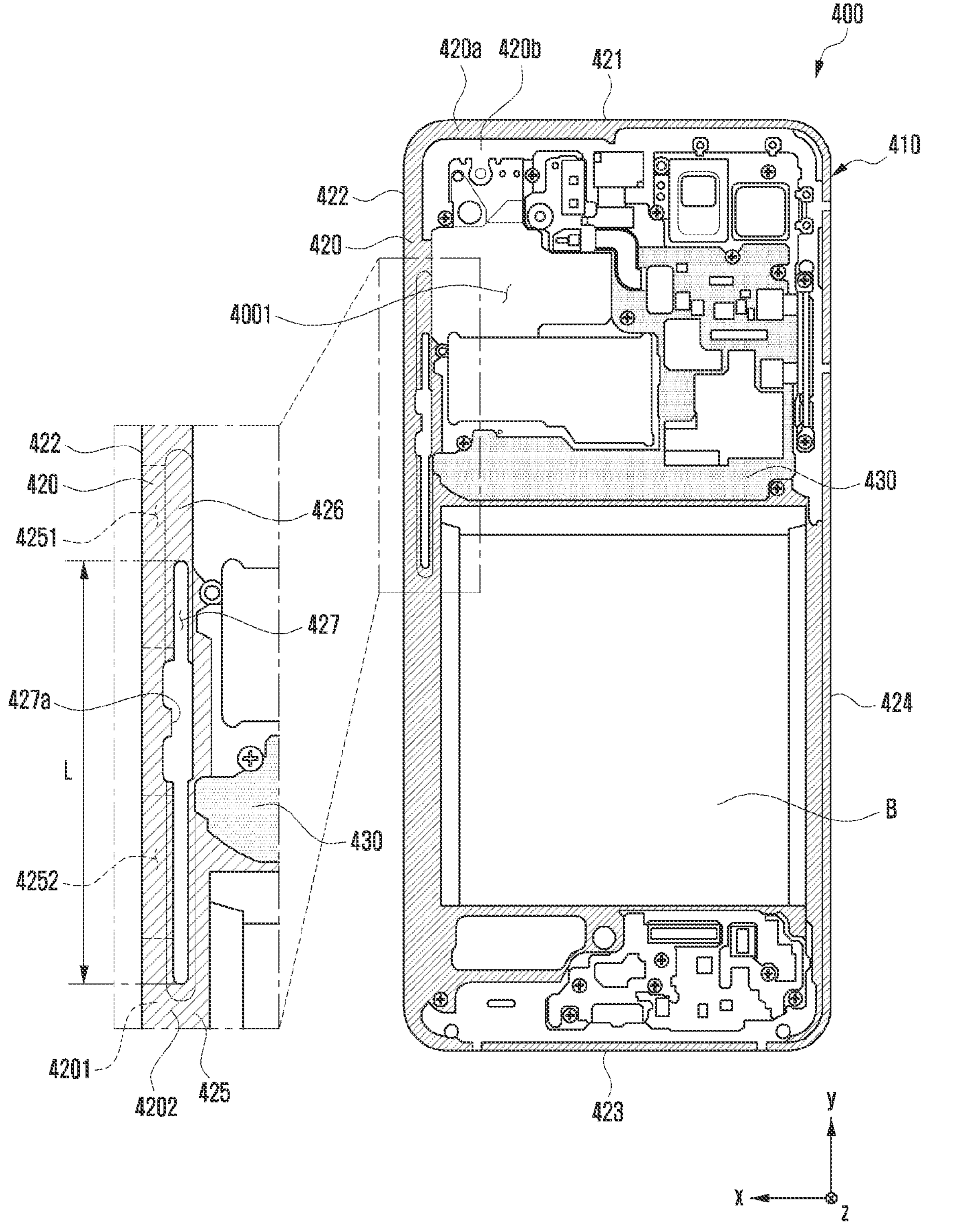
FIG. 4A is a diagram illustrating an example configuration of an electronic device including a slot formed in a conductive portion according to various embodiments.
Figure 4B:
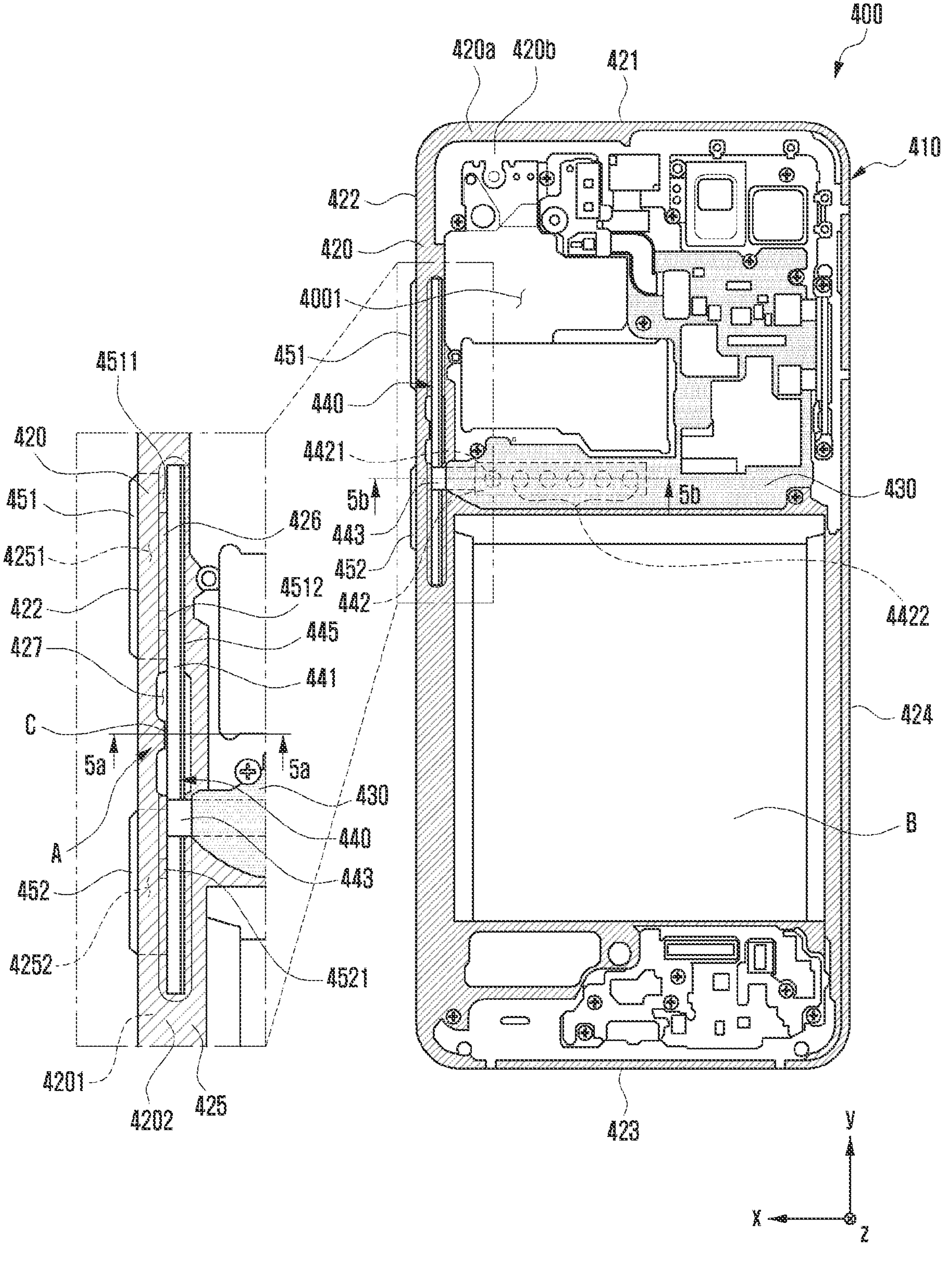
FIG. 4B is a diagram illustrating an electrical connection structure and at least one key button arranged in the electronic device of FIG. 4A according to various embodiments.

FIG. 4A is a diagram illustrating an example configuration of an electronic device including a slot provided in a conductive portion according to various embodiments. FIG. 4B is a diagram illustrating a state in which an electrical connection structure and at least one key button are arranged in the electronic device of FIG. 4A according to various embodiments.

The electronic device 400 of FIG. 4 may be at least partially similar to the electronic device 101 in FIG. 1A, the electronic device 200 in FIG. 2A, and/or the electronic device 300 of FIG. 3, or may include other embodiments of the same.

In FIGS. 4A and 4B, the electronic device 400 is illustrated in the state in which the rear surface cover (e.g., the rear surface cover 380 in FIG. 5A) is omitted for convenience of description.

Referring to FIGS. 4A and 4B, the electronic device 400 (e.g., the electronic device 101 in FIG. 1, the electronic device 200 in FIG. 2A, and/or the electronic device 300 in FIG. 3) may include a housing 410 (e.g., the housing 210 in FIG. 2A) (a housing structure) including a front surface cover (e.g., the front surface plate 202 in FIG. 2A or the front surface cover 320 in FIG. 5A) (e.g., a first cover or a first plate), a rear surface cover facing away from the front surface cover (e.g., the rear surface plate 211 in FIG. 2A or the rear surface cover 380 in FIG. 5A) (e.g., a second cover or a second plate), and a lateral member 420 (e.g., the side surface bezel structure 218 in FIG. 2A or the lateral member 310 in FIG. 3) surrounding the inner space 4001 between the front surface cover and the rear surface cover. According to an embodiment, the lateral member 420 may at least partially include a conductive portion **420*a* (e.g., a metal material) and/or a non-conductive portion 420*b* (e.g., a polymer material). According to an embodiment, the lateral member 420 may be provided by injection molding or structurally coupling the non-conductive portion 420*b* to the conductive portion 420*a***.

According to various embodiments, the lateral member 420 may include a first side surface 421 having a first length, a second side surface 422 extending in a vertical direction from the first side surface 421 and having a second length longer than the first length, a third side surface 423 extending in a direction parallel to the first surface 421 from the second side surface 422 and having the first length, and a fourth side surface 424 extending from the third side surface 423 in a direction parallel to the second side surface 422 and having the second length. According to an embodiment, the lateral member 420 may include a support member 425 extending from a portion of at least one (e.g., the second side surface 422) of the above-mentioned side surfaces 421, 422, 423, and 424 to the inner space 4001. According to an embodiment, at least a portion of the support member 425 may be configured with a conductive portion **420*a*. According to an embodiment, the support member 425 may extend from the lateral member 420 or may be disposed to be structurally coupled to the lateral member 420. According to an embodiment, the support member 425 may include a first surface 4201 oriented in a first direction (e.g., the z-axis direction) and a second surface 4202 oriented in a second direction (e.g., the −z-axis direction) opposite to the first direction in which the first surface 4201 is oriented. According to an embodiment, the electronic device 400 may include a display (e.g., the display 330 in FIG. 5A) disposed to be supported by at least a portion of the first surface 4201 and to be visible from the outside through the front surface cover (e.g., the front surface cover 320 in FIG. 5A). According to an embodiment, the electronic device 400 may include a battery B (e.g., the battery 350 in FIG. 3) and/or a device substrate (e.g., the first substrate 341 in FIG. 3) disposed to be supported by at least a portion of the second surface 4202**.

According to various embodiments, the lateral member 420 may include a long recess 426 provided in the conductive portion **420*a* of the support member 425. According to an embodiment, the recess 426 may be configured to be lower than the second surface 4202 of the support member 425. According to an embodiment, the recess 426 may be configured to have a length that is capable of accommodating at least a portion of the substrate 441 of the electrical connection structure 440, which will be described later. According to an embodiment, the lateral member 420 may include a long slot 427 provided in the recess 426. According to an embodiment, the slot 427 may be provided to penetrate from the recess 426 to the first surface 4201 of the support member 425. According to an embodiment, the slot 427 may be filled with a non-conductive portion 420*b*. In various embodiments, at least a portion of the slot 427 and/or the recess 426 may be filled with the non-conductive portion 420*b*. In various embodiments, slot 427 and recess 426 may be formed to have substantially the same length. In various embodiments, the slot 427 may have a shorter length than recess 426. According to an embodiment, the electronic device 400 may include a slot antenna A configured to operate in a predetermined frequency band together with a peripheral conductive portion by crossing the slot 427 through the substrate 441 of the electrical structure 440 and by being electrically connected to a wireless communication circuit (e.g., the wireless communication circuit 435 in FIG. 5B (e.g., the wireless communication module 192 in FIG. 1)) of the device substrate 430. In this case, the length L (e.g., the electromagnetic length) of the slot 427** may be determined based on the operating frequency band of the slot antenna A.

According to various embodiments, the electronic device 400 may include one or more key button devices 451 and 452 disposed to be operably exposed from the outside through at least a portion of the lateral member 420. According to an embodiment, the one or more key button devices 451 and 452 may include a first key button device 451 disposed through a first opening 4251 extending from the second side surface 422 of the lateral member 420 to the inner space 4001 and/or a second key button device 452 disposed through a second opening 4252 extending from the second side surface 422 of the lateral member 420 to the inner space 422. According to an embodiment, the first opening 4251 and/or the second opening 4252 may be disposed to be connected to the recess 426 and/or the slot 427 in the inner space 4001. For example, the first opening 4251 and/or the second opening 4252 may be provided in a direction (e.g., the z-axis direction) perpendicular to the penetration direction of the slot 427 (e.g., the x-axis direction). According to an embodiment, the first opening 4251 and/or the second opening 4252 may be disposed at a position that at least partially overlaps the recess 426 when the second side surface 422 is viewed from the outside. In various embodiments, the first opening 4251 and/or the second opening 4252 may be disposed on at least one of the first side surface 421, the third side surface 423, or the fourth side surface 424 depending on the arrangement position of the slot 427 disposed in the inner space of the electronic device 400.

According to various embodiments, the electronic device 400 may include an electrical connection structure 440 configured to electrically connect at least a portion of the inner surface 427*a* of the slot 427 to the wireless communication circuit (e.g., the wireless communication circuit 435 in FIG. 5B) on the device substrate 430 disposed in the inner space 4001 of the electronic device 400 and to electrically connect the one or more key button devices 451 and 452 to the device substrate 420. According to an embodiment, the electrical connection structure 440 may include a substrate 441 accommodated in the recess 426 to correspond to the slot 427, a connection substrate 442 electrically connected to the device substrate 430 and including one or more conductive pads 4421 and 4422, and a connector 443 electrically connecting the device substrate 441 to the connection substrate 442. According to an embodiment, the substrate 441 is seated in the recess 426 via a separately provided substrate support plate 445 so that the substrate 441 can be prevented or inhibited from randomly moving due to an external impact. According to an embodiment, the device substrate 441 and the connection substrate 442 may include a printed circuit board (PCB) or a flexible printed circuit board (FPCB). According to an embodiment, the connector 443 may include a flexible printed circuit (FPC). According to an embodiment, the connector 443 and the connection substrate 442 may be replaced with an integrated flexible RF cable (FRC). In various embodiments, the electrical connection structure 440 may be configured with a single FPCB. According to an embodiment, the connector 443 may be attached to the substrate 441 and the connection substrate 442 by soldering, conductive bonding, or conductive tape. According to an embodiment, the substrate 441 may be electrically connected to the inner surface 427*a* of the slot 427 and/or the inner surface of the recess 426 in the conductive portion 420*a* in a contact manner via the conductive contact C. According to an embodiment, the conductive contact C may include at least one of a C-clip, a pogo pin, conductive tape, or conductive bonding. Accordingly, the conductive portion 420*a* adjacent to the slot 427 may operate as a slot antenna A by being electrically connected to the substrate 441 across the slot 427 and being electrically connected to the wireless communication circuit (e.g., the wireless communication circuit 435 in FIG. 5B) of the device substrate 430 disposed inside the inner space 4001 of the electronic device 400 via the connector 443 and the connection substrate 442. Accordingly, the wireless communication circuit 435 may be configured to transmit or receive a wireless signal in a predetermined frequency band (e.g., a band ranging from about 3 GHz to 10 GHz) (e.g., an NR band or a UWB band) via a connection structure electrically connected to the conductive portion 420*a* of the lateral member 420 across the slot 427.

According to various embodiments, the first key button device 451 accommodated in the first opening 4251 may be electrically connected to the substrate 441 accommodated in the recess 426 via at least one switching member 4511 or 4512. According to an embodiment, the second key button device 452 accommodated in the second opening 4252 may be electrically connected to the substrate 441 accommodated in the recess 426 via at least one switching member 4521. Accordingly, since the first key button device 451 and the second key button device 452 are electrically connected to the device substrate 430 disposed inside the inner space 4001 of the electronic device 400 via the substrate 441, the connector 443, and the connection substrate 442 of the electrical connection structure 440, a switching signal can be transmitted to the device substrate 430.

In the electronic device 400 according to example embodiments of the disclosure, the conductive portion 420*a* of the lateral member 420 and the device substrate 430 disposed inside the inner space 4001 of the electronic device 400 to be spaced apart from the slot 427 are electrically connected to each other via the electrical connection structure 440 (e.g., the substrate 441) disposed to correspond to the slot 427 provided in the conductive portion 420*a* of the lateral member 420 for the slot antenna A and the one or more openings 4251 and 4252 for the one or more key button devices 451 and 452, which may be helpful for efficiently using the arrangement space compared to an individual connection structure between a slot antenna and a key button device.

Figure 5A:
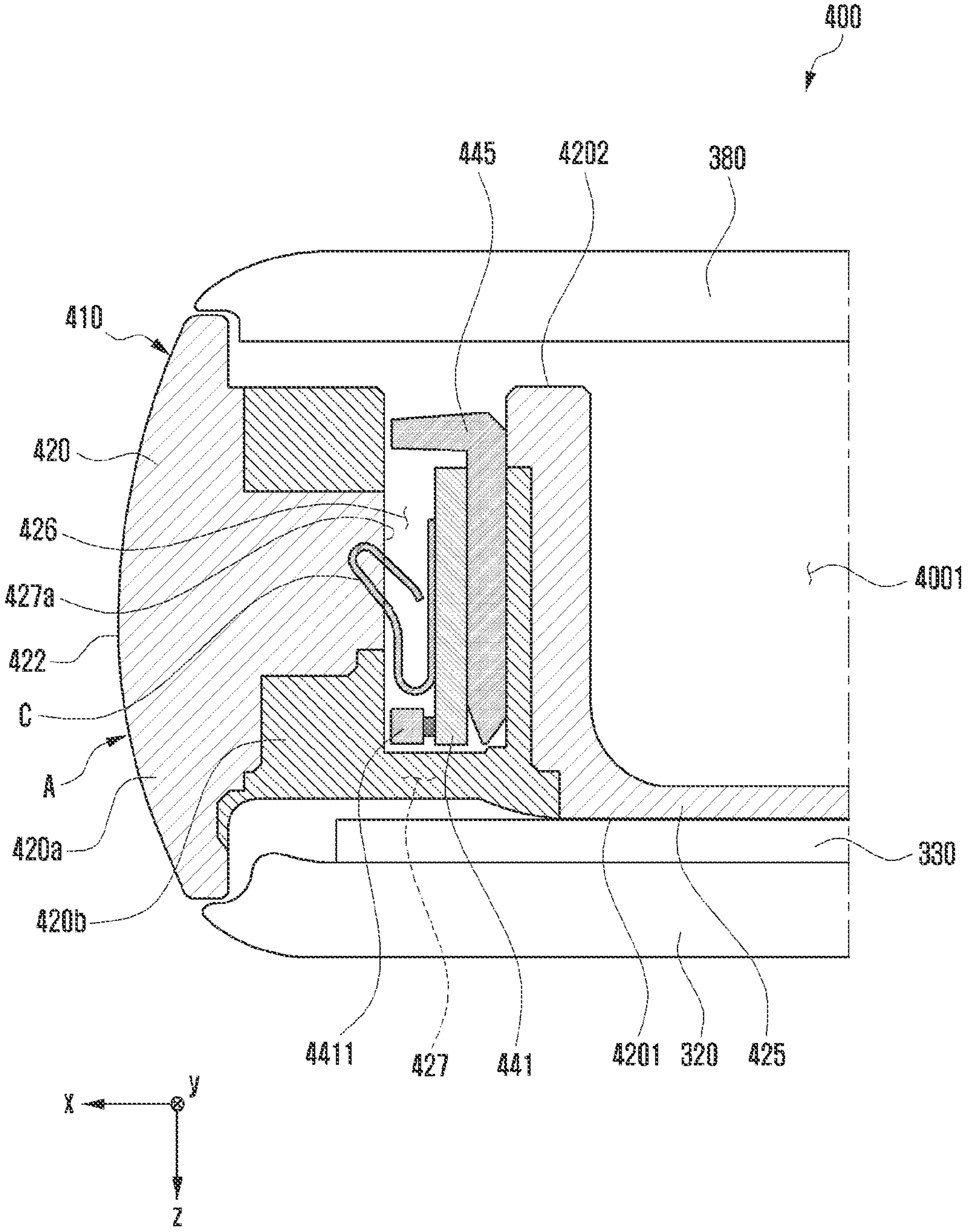
FIG. 5A is a partial cross-sectional view of the electronic device taken along line 5*a*-5*a* in FIG. 4B according to various embodiments.

FIG. 5A is a partial cross-sectional view of the electronic device taken along line 5*a*-5*a* in FIG. 4B according to various embodiments.

Referring to FIG. 5A, the electronic device 400 may include a housing 410 including a front surface cover 320 oriented in a first direction (e.g., the z-axis direction), a rear surface cover 380 oriented in a second direction (e.g., the −z-axis direction) opposite to the first direction in which the front surface cover 320 is oriented, and a lateral member 420 disposed to surround the inner space 4001 between the rear surface cover 380 and the front surface cover 320. According to an embodiment, the lateral member 420 may include a conductive portion 420*a* and a non-conductive portion 420*b* coupled (e.g., coupled through injection molding) with the conductive portion 420*a*. According to an embodiment, the lateral member 420 may include a support member 425 that extends at least partially from the second side surface 422 to the inner space 4001. According to an embodiment, the support member 425 may at least partially include the conductive portion 420*a*. According to an embodiment, the support member 425 may include a first surface 4201 facing the front surface cover 320 and a second surface 4202 facing the rear surface cover. According to an embodiment, the electronic device 400 may include a display 330 disposed to be visible from the outside through the front surface cover 320 while being at least partially supported by the first surface 4201.

According to various embodiments, the lateral member 420 may include a recess 426 extending in a direction from the second side surface 4202 toward the first surface 4201 through the support member 425. According to an embodiment, the lateral member 420 may include a slot 427 provided in the recess 426 and penetrating the lateral member to the first surface 4201. According to an embodiment, the recess 426 may be provided to at least partially penetrate the lateral member from the second surface 4202 to the first surface 4201, and may be partially filled with the non-conductive portion 420*b*.

According to various embodiments, the substrate 441 of the electrical connection structure 440 may be disposed to be at least partially seated in the recess 426. According to an embodiment, the substrate 441 may include at least one conductive contact C attached through soldering. Accordingly, the conductive contact C (e.g., a C-clip) may be brought into physical contact with the inner surface 427*a* of the slot 427 by simply seating the substrate 441 in the recess 426. According to an embodiment, the conductive portion 420*a* adjacent to the slot 427 may operate as a slot antenna A by being electrically connected to the substrate 441 via the conductive contact C across the slot 427 and being electrically connected to the wireless communication circuit (e.g., the wireless communication circuit 435 in FIG. 5B) of the device substrate (e.g., the device substrate 430 in FIG. 4B) disposed inside the inner space 4001 of the electronic device 400 via the connector (e.g., the connector 443 in FIG. 4B) and the connection substrate (e.g., the connection substrate 442 in FIG. 4B). According to an embodiment, the substrate 441 may include at least one matching circuit 4411 (e.g., a passive element such as a capacitor and/or an inductor) disposed adjacent to the conductive contact C, which may be helpful for designing a 50Ω RF transmission path via the conductive contact C.

Figure 5B:
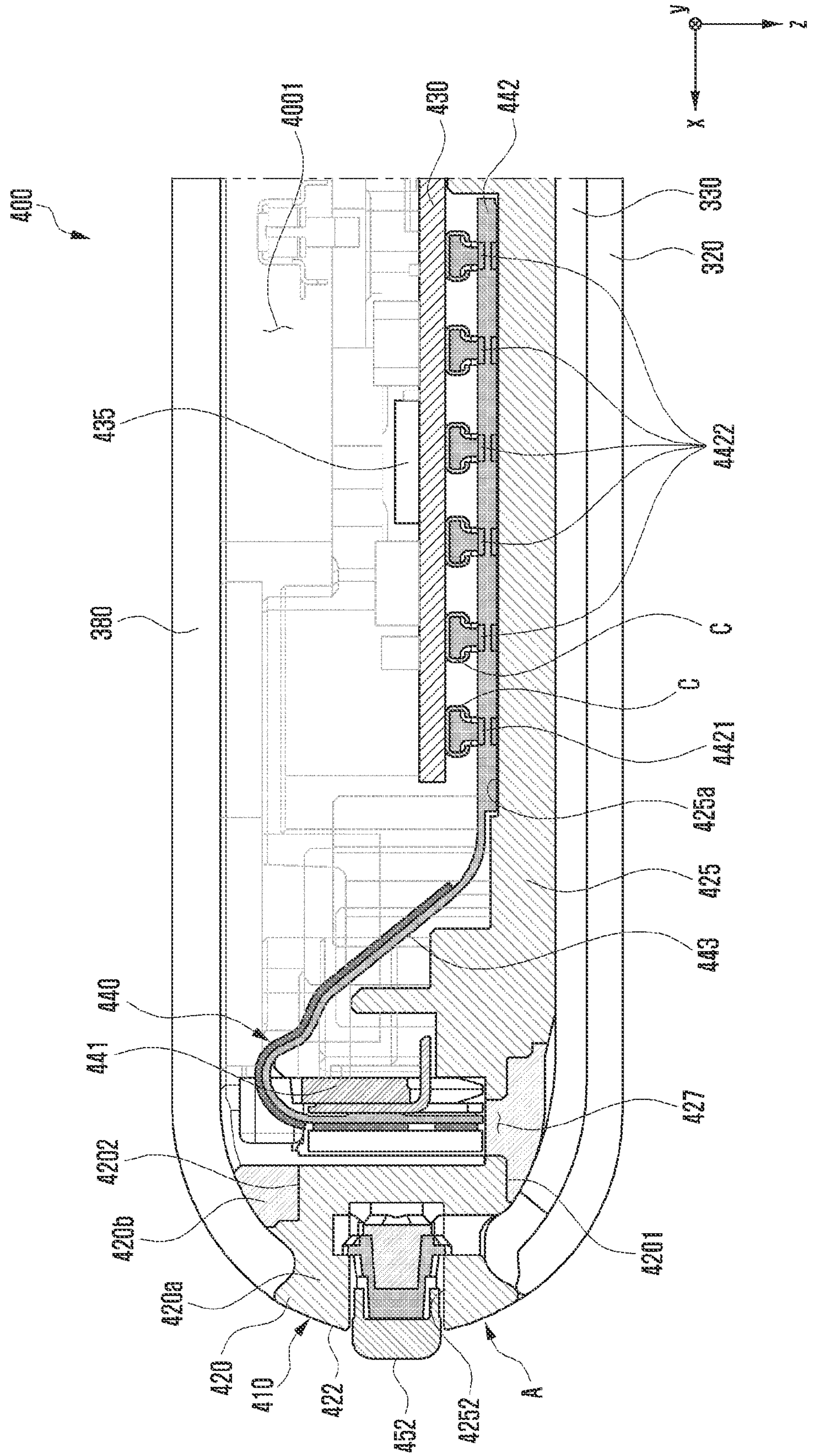
FIG. 5B is a partial cross-sectional view of the electronic device taken along line 5*b*-5*b* in FIG. 4B according to various embodiments.

FIG. 5B is a partial cross-sectional view of the electronic device taken along line 5*b*-5*b* in FIG. 4B according to various embodiments.

Referring to FIG. 5B, the electronic device 400 may include a housing 410 including a front surface cover 320 oriented in a first direction (e.g., the z-axis direction), a rear surface cover 380 oriented in a second direction (e.g., the −z-axis direction) opposite to the first direction in which the front surface cover 320 is oriented, and a lateral member 420 disposed to surround the inner space 4001 between the rear surface cover 380 and the front surface cover 320.

According to various embodiments, the electronic device 400 may include an electrical connection structure 440 including a substrate 441 disposed to correspond to the slot 427 provided in the recess 426 of the lateral member 420, a connection substrate 442 disposed to correspond to at least a portion of the device substrate 430 disposed in the inner space 4001 of the electronic device 400, and a connector 443 configured to electrically connect the substrate 441 to the connection substrate 442. According to an embodiment, the connector 443 and the connection substrate 442 of the electrical connection structure 440 may be replaced with an integrated FPCB or FRC. According to an embodiment, the connection substrate 442 may extend into the inner space 4001 of the electronic device 400 through the connector 443. According to an embodiment, the connection substrate 442 may be disposed between the support member 425 and the device substrate 430. For example, the connection substrate 442 may be disposed to overlap at least a portion of the device substrate 430 when the rear surface cover 380 is viewed from above. According to an embodiment, the connection substrate 442 may include a plurality of conductive pads 4421 and 4422. According to an embodiment, the plurality of conductive pads 4421 and 4422 may include at least one first conductive pad 4421 configured to transmit a wireless signal for a slot antenna A and at least one second conductive pad 4422 configured to transmit a key input signal of at least one key button device 452. According to an embodiment, the plurality of conductive pads 4421 and 4422 may be disposed on the connection substrate 442 to be at least partially exposed to the outside. According to an embodiment, the device substrate 430 may include a plurality of conductive contacts C which are disposed at positions corresponding to the plurality of conductive pads 4421 and 4422, respectively. According to an embodiment, the plurality of conductive contacts C may include a C-clip, conductive foam (POM), or conductive tape. Accordingly, when the device substrate 430 faces the connection substrate 4420, the plurality of conductive contacts C may be electrically connected by being brought into contact with the plurality of conductive pads 4421 and 4422, respectively.

According to various embodiments, the connection substrate 442 may be disposed to be supported by the support member 425. According to an embodiment, the position of the connection substrate 442 may be aligned by being partially seated on the substrate accommodation portion 425*a* provided to be lower than one surface of the support member 425. In various embodiments, the connection substrate 442 may be attached to the substrate accommodation portion 425*a* by bonding or taping. Accordingly, the connection substrate 442 is disposed to be aligned at a predetermined position of the support member 425, and the plurality of conductive contacts C are naturally and correspondingly brought into contact with the plurality of conductive pads 4421 and 4422 only by an assembly process of disposing the device substrate 430 on the plurality of conductive pads, which may be helpful for improving assembly.

Figure 6:
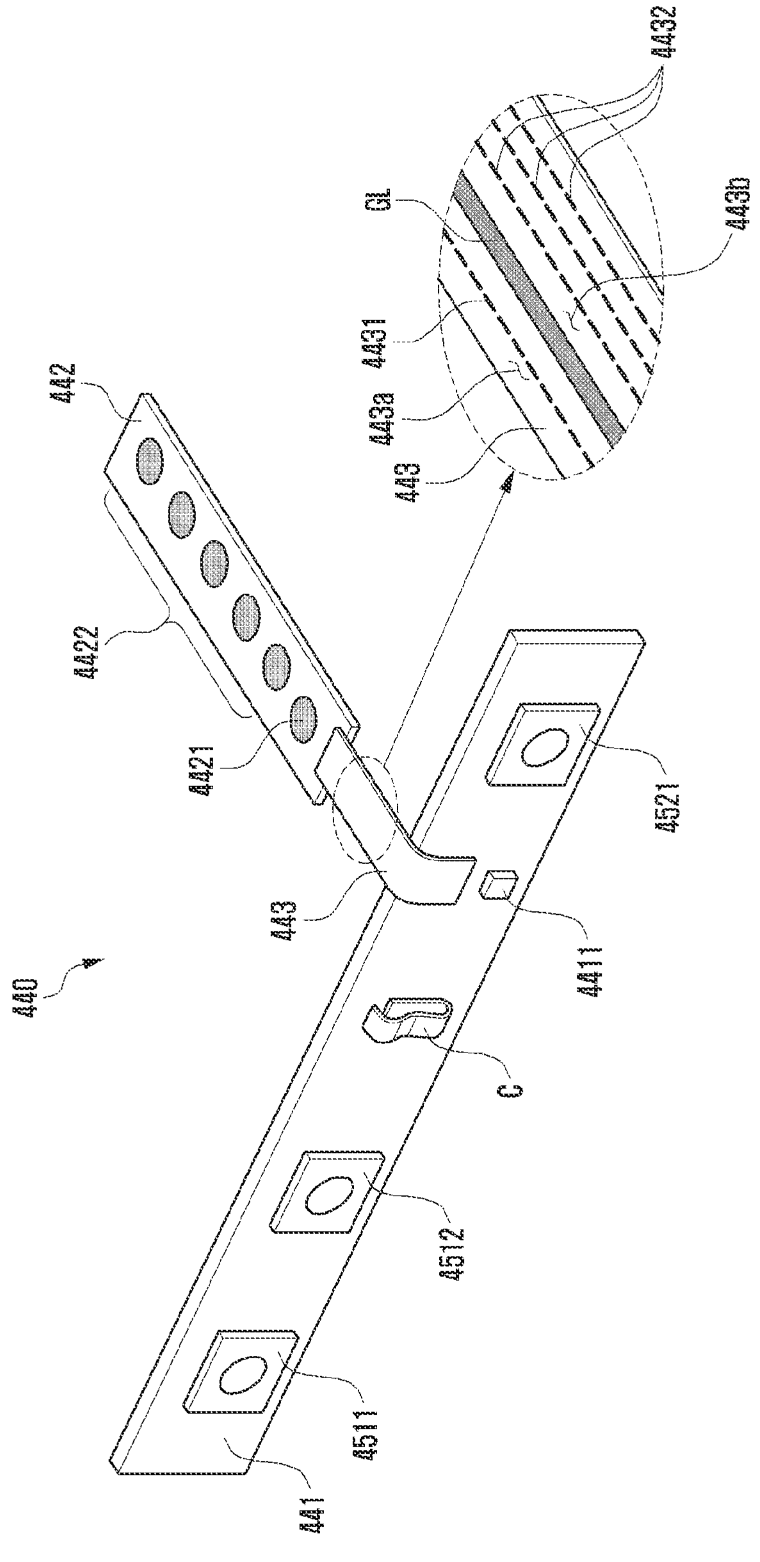
FIG. 6 is a perspective view of an electrical connection structure according to various embodiments.

FIG. 6 is a perspective view illustrating an electrical connection structure according to various embodiments.

Referring to FIG. 6, an electrical connection structure 440 (e.g., an electrical connection member or electrical connection structure) may include a substrate 441 disposed to correspond to a slot (e.g., the slot 427 in FIG. 4B) provided in a recess (e.g., the recess 426 in FIG. 4B) in a lateral member 420 (e.g., the lateral member 420 in FIG. 4B), a connection substrate 442 disposed to correspond to at least a portion of a device substrate (e.g., the device substrate 430), and a connector 443 configured to electrically connect the substrate 441 to the connection substrate 442.

According to various embodiments, the electrical connection structure 440 may include at least one conductive contact C (e.g., a C-clip) and one or more switching members 4511, 4512, and 4521 arranged at a predetermined interval on the substrate 441. According to an embodiment, the at least one conductive contact C may be electrically connected to a wireless communication circuit (e.g., the wireless communication circuit 435) of the device substrate 430 via the connector 443 and the connection substrate 442 of the electrical connection structure 440 by being brought into contact with the inner surface (e.g., the inner surface 427*a* in FIG. 5A) of the slot (e.g., the slot 427 in FIG. 5A). According to an embodiment, one or more switching members 4511, 4512, and 4521 may be disposed at positions corresponding to one or more key button devices (e.g., the key button devices 451 and 452 in FIG. 4B) disposed through one or more openings (e.g., the openings 4251 and 5252 in FIG. 4B) provided in the lateral member (e.g., the lateral member 420 in FIG. 4A), and may be electrically connected to the device substrate 430 via the connector 443 and the connection substrate 442 of the electrical connection structure 440. According to an embodiment, the conductive contact C may be disposed between the plurality of switching members 4511, 4512, and 4521, but its position may be changed.

According to various embodiments, the connection substrate 442 may include a plurality of conductive pads 4421 and 4422. According to an embodiment, the plurality of conductive pads 4421 and 4422 may include at least one first conductive pad 4421 configured to transmit a wireless signal for a slot antenna A and at least one second conductive pad 4422 configured to transmit a key input signal via the one or more switching members 4511, 4512, and 4521. According to an embodiment, the plurality of conductive pads 4421 and 4422 may be disposed on the connection substrate 442 to be at least partially exposed to the outside. According to an embodiment, at least one first conductive pad 4421 may be used as an electrical path for transmitting an RF signal for a slot antenna A. In this case, one or more first conductive pads 4421 may be arranged on the connection substrate 442 to be spaced apart from a peripheral conductive area (e.g., a ground layer or a peripheral conductive pad) at a predetermined interval through a fill-cut area. For example, the one or more first conductive pads 4421 may be spaced apart from a peripheral conductive area by a distance of at least about 2 mm through the fill-cut area.

According to various embodiments, the connector 443 may include at least one first electrical path 4431 (e.g., an RF line) configured to transmit an RF signal for the slot antenna A and at least one second electrical path 4432 (e.g., a key input signal line) configured to transmit a key input signal for a key button device (e.g., the key button devices 451 and 452 in FIG. 4B). According to an embodiment, the at least one first electrical path 4431 may be disposed through a first area 443*a* of the connector 443. According to an embodiment, the at least one second electrical path 4432 may be disposed through a second area 443*b* separated from the first area 443*a* in the connector 443. According to an embodiment, the connector 443 may include a ground line GL disposed in a boundary area to avoid mutual interference between the at least one first electrical path 4431 and the at least one second electrical path 4432.

According to an example embodiment of the disclosure, the antenna A and the key button devices 451 and 452 disposed around the antenna may be connected to the device substrate 430 via substantially the same electrical connection structure 440. However, the disclosure is not limited thereto, and the key button devices 451 and 452 may be replaced with at least one sensor module, camera module, or input/output device (e.g., a speaker or microphone) that may be placed on the electronic device 400.

Figure 7A:
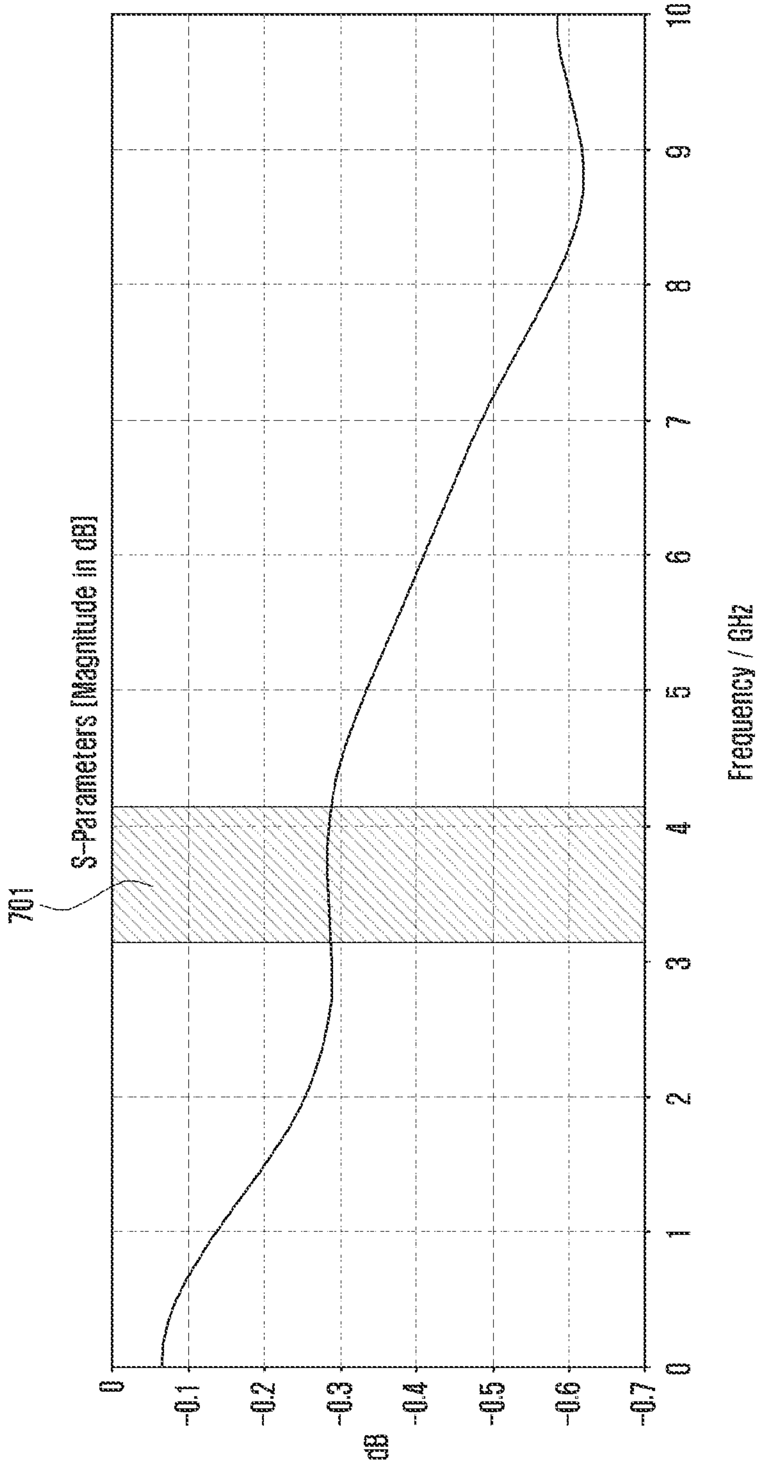
FIG. 7A is a graph showing transmission efficiency for an electrical path of the electrical connection structure according to various embodiments.
Figure 7B:
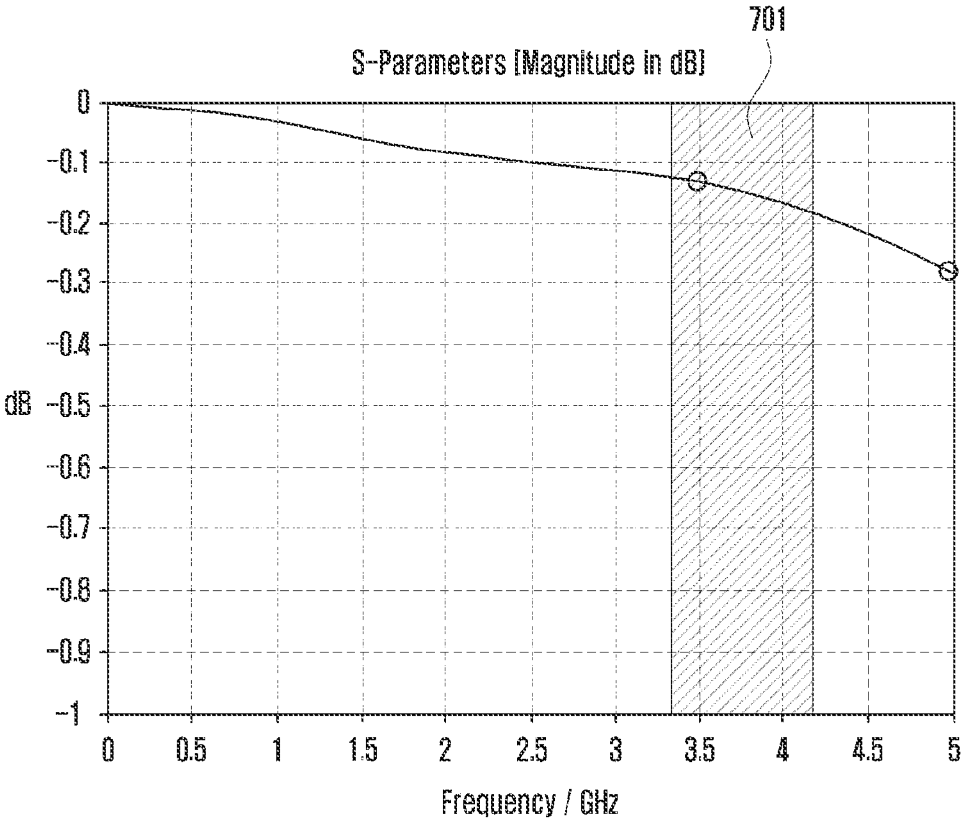
FIG. 7B is a graph showing transmission efficiency for electrical connection via a conductive contact between the electrical connection structure and the device substrate according to various embodiments.

FIG. 7A is a graph illustrating transmission efficiency for an electrical path of an electrical connection structure according to various embodiments. FIG. 7B is a graph illustrating transmission efficiency for electrical connection via a conductive contact between an electrical connection structure and a device substrate according to various embodiments.

Referring to FIG. 7A, at least one first electrical path 4431 for transmitting an RF signal of the connector 443 generates a loss of −0.3 dB in a predetermined frequency band (Area 701) (e.g., about 3.3 GHz to 4.2 GHz (the NR band)). Thus, considering the general contact loss of antennas (e.g., about −0.5 dB), it can be seen that the above-mentioned loss is an appropriate level.

Referring to FIG. 7B, the connection structure for transmitting an RF signal between the at least one first conductive pad 4421 of the connection substrate 442 and the at least one conductive contact C of the device substrate 430 generates a loss of about −0.1 dB to −0.2 dB in a predetermined frequency band (Area 701) (e.g., about 3.3 GHz to 4.2 GHz (the NR band)). Thus, considering the general contact loss of antennas (e.g., about −0.3 to −0.5 dB), it can be seen that the above-mentioned loss is an appropriate level.

Figure 8A:
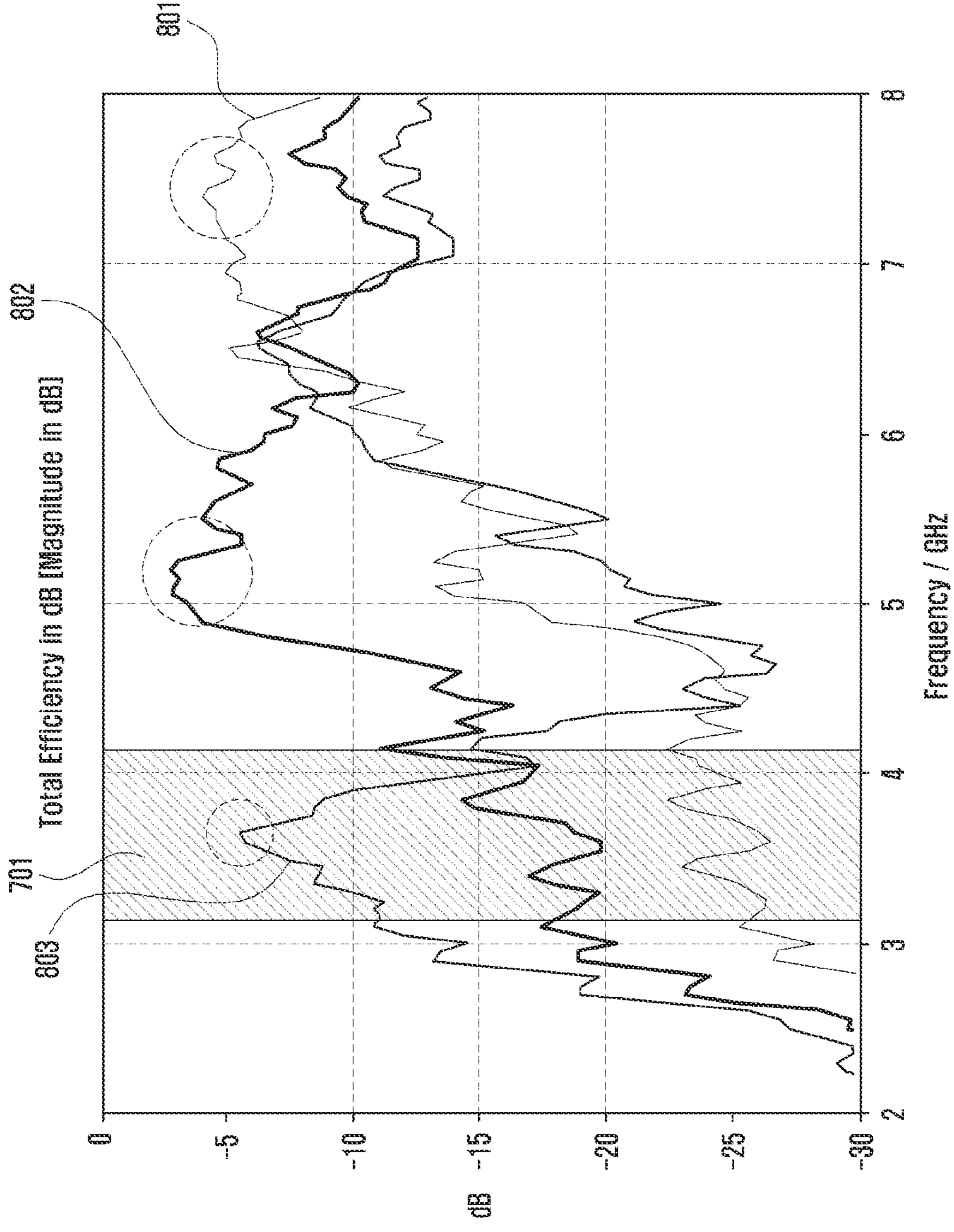
FIG. 8A is a graph showing radiation performance of an antenna before and after disposing a substrate corresponding to the slot according to various embodiments.
Figure 8B:
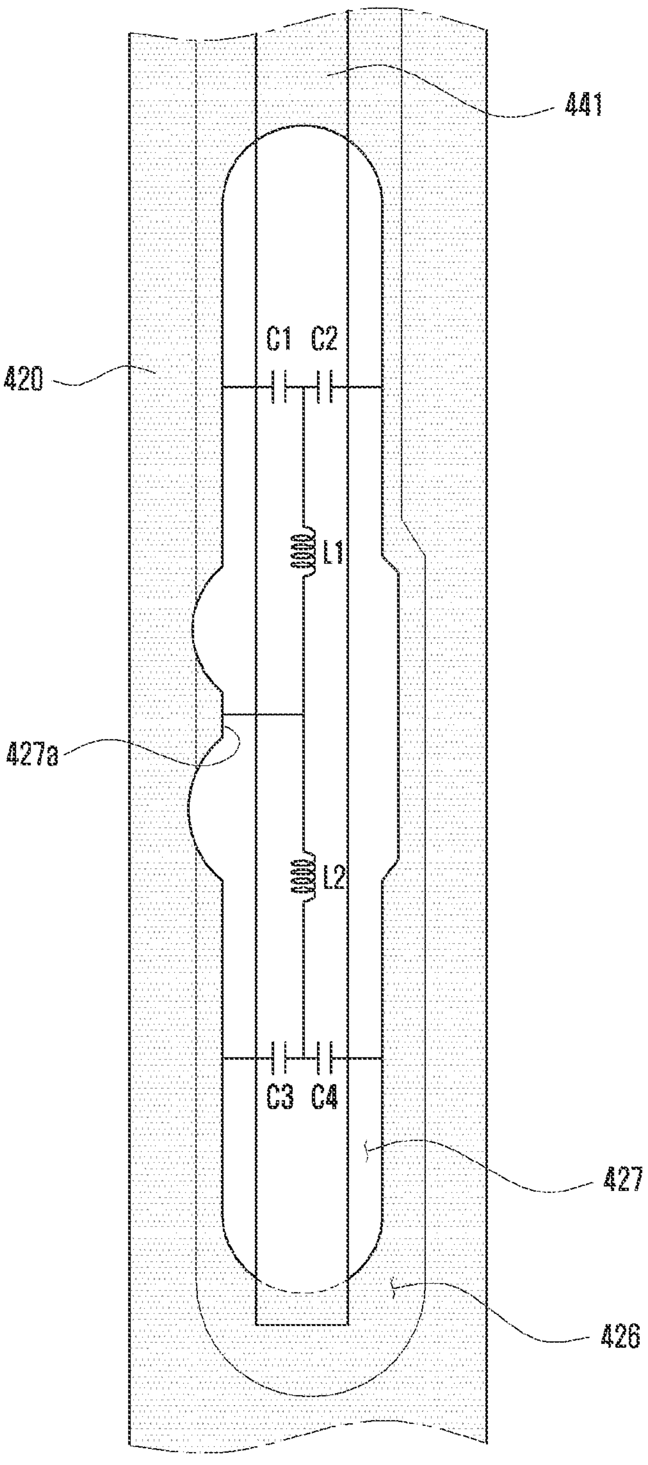
FIG. 8B is an equivalent circuit diagram illustrating coupling components generated between a slot and a substrate according to various embodiments.

FIG. 8A is a graph illustrating radiation performance of an antenna before and after disposing a substrate corresponding to the slot according to various embodiments. FIG. 8B is an equivalent circuit diagram illustrating coupling components generated between a slot and a substrate according to various embodiments.

Referring to FIGS. 8A and 8B, the slot antenna A connected to the electrical connection structure 440 through the slot having a first electrical length (e.g., about 10.5 mm) may operate in an operating frequency band ranging from about 7 GHz to 8 GHz (Graph 801). For example, in order to configure a slot antenna A operating in a predetermined frequency band (Area 701) (e.g., 3.3 GHz to 4.2 GHz), it is necessary to form the slot to have a second electrical length (e.g., about 45 mm) that is longer than the first electrical length. However, it can be seen that, due to the conductive member (e.g., a conductive sheet layer) of a display, the slot 427 has a third electrical length (e.g., about 20 mm) that is shorter than the second electrical length and that low shift is possible up to the 5 GHz band (Graph 802). When the substrate 441 of the electrical connection structure 440 according to an example embodiment of the disclosure is disposed at a position corresponding to the slot 427, even when the second electrical length of the slot is not extended, shift to the above-mentioned predetermined frequency band is possible through the coupling components formed by the substrate 441 and the conductive portion 427*a* around the slot 427 (Graph 803). These coupling components may include capacitance components C1, C2, C3, and C4 formed through coupling between a conductive area such as a ground layer disposed on the substrate 441 and the inner surface 427*a* of the slot 427 and inductance components L1 and L2 formed inside the substrate 441.

The electronic device 400 according to example embodiments of the disclosure includes a slot antenna A induced to operate in a predetermined frequency band through low shift while reducing the extension of the slot 427 through coupling components generated by disposing the substrate 441 of the electrical connection structure 440 around the slot 427, which may be helpful for reinforcing the rigidity of the electronic device 400.

According to various example embodiments, an electronic device (e.g., the electronic device 400 in FIG. 4B) may include: a housing (e.g., the housing 410 in FIG. 4B) including a front surface cover (e.g., the front surface cover 320 in FIG. 5A), a rear surface cover facing away from the front surface cover (e.g., the rear surface cover 380 in FIG. 5A), and a side surface (e.g., the lateral member 420 in FIG. 4B) surrounding the space between the front surface cover and the rear surface cover and at least partially including a conductive portion (e.g., the conductive portion 420*a* in FIG. 4B), at least one electronic component (e.g., the key button devices 451 and 452 in FIG. 4B) disposed to be connected to the space from the outside through an opening (e.g., the openings 4251 and 4252 in FIG. 4B) provided in the conductive portion, a slot (e.g., the slot 427 in FIG. 4B) at least partially connected to the opening in the conductive portion and having a specified length, an electrical connection structure comprising a conductor(e.g., the electrical connection structure 440 in FIG. 4B) disposed to at least partially correspond to the slot and electrically connecting the at least one electronic component to a device substrate (e.g., the device substrate 430 in FIG. 4B) disposed in the space, a conductive contact (e.g., the conductive contact C in FIG. 4B) electrically connecting the electrical connection structure to the conductive portion by crossing the slot, and a wireless communication circuit (e.g., the wireless communication circuit 435 in FIG. 5B) disposed on the device substrate and configured to transmit and/or receive a wireless signal in a specified frequency band through at least a portion of the conductive portion and the slot.

According to various example embodiments, the electrical connection structure may include a substrate disposed to correspond to the slot, a connection substrate disposed to correspond to the device substrate, and a connector connecting the substrate to the connection substrate.

According to various example embodiments, the side surface includes a recess provided in the conductive portion, and the slot may be provided in the recess.

According to various example embodiments, at least a portion of the slot and/or the recess may include a non-conductive portion disposed therein.

According to various example embodiments, the slot may have a length shorter than or equal to a length of the recess.

According to various example embodiments, the substrate may be at least partially accommodated in the recess.

According to various example embodiments, the connector and the connection substrate may be integrated.

According to various example embodiments, the connection substrate may be disposed to overlap at least a portion of the device substrate when the rear surface cover is viewed from above.

According to various example embodiments, the side surface may further include a support extending into the space, the device substrate may be disposed between the support and the rear surface cover, and the connection substrate may be disposed between the support and the device substrate.

According to various example embodiments, the connection substrate may include at least one first conductive pad configured to transmit the wireless signal, and at least one second conductive pad configured to transmit a signal related to the at least one electronic component, wherein the at least one first conductive pad and the at least one second conductive pad may be exposed to the outer surface of the connection substrate.

According to various example embodiments, the device substrate may include at least one conductive contact disposed at a position corresponding to the at least one first conductive pad and the at least one second conductive pad, and based on the connection substrate facing the device substrate, the at least one conductive contact may be in contact with the at least one first conductive pad and the at least one second conductive pad.

According to various example embodiments, the at least one conductive contact may include a C-clip, conductive foam (POM), or conductive tape.

According to various example embodiments, the at least one frequency band may be determined based on the length of the slot.

According to various example embodiments, the at least one electronic component may include at least one key button device disposed through the opening.

According to various example embodiments, the space may further include a display visible from the outside through at least a portion of the front surface cover.

According to various example embodiments, an electronic device (e.g., the electronic device 400 in FIG. 4B) may include: a housing (e.g., the housing 410 in FIG. 4B) that at least partially includes a conductive portion (e.g., the conductive portion 420*a* in FIG. 4B), at least one electronic component (e.g., the key button devices 451 and 452 in FIG. 4B) disposed in the inner space (e.g., the inner space 4001 in FIG. 4B) of the housing, a slot (e.g., the slot 427 in FIG. 4B) provided in the conductive portion within a specified distance of the at least one electronic component to have a specified length, an electrical connection structure comprising a conductor (e.g., the electrical connection structure 440 in FIG. 4B) disposed to at least partially correspond to the slot and electrically connecting the at least one electronic component to a device substrate (e.g., the device substrate 430 in FIG. 4B) disposed in the inner space, a conductive contact (e.g., the conductive contact C in FIG. 4B) electrically connecting the electrical connection structure to the conductive portion by crossing the slot, and a wireless communication circuit (e.g., the wireless communication circuit 435 in FIG. 5B) disposed on the device substrate and configured to transmit and/or receive a wireless signal in a specified frequency band through at least a portion of the conductive portion and the slot.

According to various example embodiments, the electrical connection structure may include a substrate disposed to correspond to the slot, a connection substrate disposed to correspond to the device substrate, and a connector connecting the substrate to the connection substrate.

According to various example embodiments, the connector and the connection substrate may be integrated.

According to various example embodiments, the connection substrate may be disposed to overlap at least a portion of the device substrate.

According to various example embodiments, the connection substrate may include at least one first conductive pad configured to transmit the wireless signal, and at least one second conductive pad configured to transmit a signal related to the at least one electronic component, wherein the device substrate may include at least one conductive contact disposed at a position corresponding to the at least one first conductive pad and the at least one second conductive pad, and based on the connection substrate facing the device substrate, the at least one conductive contact may be in contact with the at least one first conductive pad and the at least one second conductive pad.

The various example embodiments of the disclosure disclosed in herein and the drawings are provided merely to illustrate various examples in order to easily describe the technical features according to various example embodiments of the disclosure and to aid in understanding of the disclosure, and are not intended to limit the scope of the disclosure. Accordingly, the scope of the disclosure is to be understood in such a manner that, in addition to the various example embodiments disclosed herein, all changes or modifications derived from the technical idea of the disclosure are included in the scope of the disclosure. It will also be understood that any of the embodiment(s) described herein may be used in conjunction with any other embodiment(s) described herein.

What is claimed is:

1. An electronic device comprising:

a housing comprising a lateral member at least partially comprising a conductive portion, the conductive portion having an opening;

at least one electronic component disposed to be connected to an inner space of the housing from an outside of the housing through the opening provided in the conductive portion;

a slot formed in the conductive portion of the lateral member and at least partially connected to the opening in the conductive portion and having a specified length;

an electrical connection structure comprising a conductor disposed to at least partially correspond to the slot and electrically connecting the at least one electronic component to a device substrate disposed in the inner space;

a conductive contact electrically connecting the electrical connection structure to the conductive portion of the lateral member by crossing the slot; and a wireless communication circuit disposed on the device substrate and configured to transmit and/or receive a wireless signal in a specified frequency band through at least a portion of the conductive portion and the slot, wherein the specified length of the slot is shorter than a physical length corresponding to the specified frequency band.

2. The electronic device of claim 1, wherein the electric connection member comprises:

a substrate disposed to correspond to the slot;

a connection substrate disposed to correspond to the device substrate; and a connector connecting the substrate to the connection substrate.

3. The electronic device of claim 2, wherein the lateral member comprises a recess provided in the conductive portion, and wherein the slot is provided in the recess.

4. The electronic device of claim 3, wherein at least a portion of the slot and/or the recess includes a non-conductive portion disposed therein.

5. The electronic device of claim 3, wherein the slot has a length shorter than or equal to a length of the recess.

6. The electronic device of claim 5, wherein the connector and the connection substrate are integrated.

7. The electronic device of claim 3, wherein the substrate is at least partially accommodated in the recess.

8. The electronic device of claim 2, wherein the connection substrate is disposed to overlap at least a portion of the device substrate when the rear surface cover is viewed from above.

9. The electronic device of claim 8, wherein the lateral member further comprises a support extending into the inner space, wherein the device substrate is disposed between the support and the rear surface cover, and wherein the connection substrate is disposed between the support and the device substrate.

10. The electronic device of claim 2, wherein the connection substrate comprises:

at least one first conductive pad configured to transmit the wireless signal; and at least one second conductive pad configured to transmit a signal related to the at least one electronic component, and wherein the at least one first conductive pad and the at least one second conductive pad are exposed to an outer surface of the connection substrate.

11. The electronic device of claim 10, wherein the device substrate comprises at least one conductive contact disposed at a position corresponding to the at least one first conductive pad and the at least one second conductive pad, and wherein based on the connection substrate facing the device substrate, the at least one conductive contact is in contact with the at least one first conductive pad and the at least one second conductive pad.

12. The electronic device of claim 11, wherein the at least one conductive contact comprises at least one of a C-clip, conductive foam (POM), or conductive tape.

13. The electronic device of claim 1, wherein the at least one frequency band is determined based on a length of the slot.

14. The electronic device of claim 1, wherein the at least one electronic component comprises at least one key button device disposed through the opening.

15. The electronic device of claim 1, comprising:

a front surface cover; and a rear surface cover facing away from the front surface cover, wherein at least a portion of the lateral member surrounds the inner space between the front surface cover and the rear surface cover, and wherein the electronic device further comprises a display disposed in the inner space to be visible from the outside through at least a portion of the front surface cover.

16. An electronic device comprising:

a housing including lateral member with a conductive portion forming at least part of an exterior surface of the housing;

at least one electronic component disposed in the housing and accessible through an opening formed in the conductive portion of the lateral member;

a slot provided in the conductive portion adjacent to the opening and within a specified distance of the at least one electronic component, the slot having a specified length;

an electrical connection structure disposed to at least partially correspond to the slot and electrically connecting the at least one electronic component to a device substrate;

a conductive contact electrically connecting the electrical connection structure to the conductive portion by crossing the slot; and a wireless communication circuit disposed on the device substrate and configured to transmit or receive a wireless signal through at least a portion of the conductive portion and the slot.

17. The electronic device of claim 16, wherein the electrical connection structure comprises:

a substrate disposed to correspond to the slot;

a connection substrate disposed to correspond to the device substrate; and a connector connecting the substrate to the connection substrate.

18. The electronic device of claim 17, wherein the connector and the connection substrate are integrated.

19. The electronic device of claim 17, wherein the connection substrate is disposed to overlap at least a portion of the device substrate.

20. The electronic device of claim 17, wherein the connection substrate comprises:

at least one first conductive pad configured to transmit the wireless signal; and at least one second conductive pad configured to transmit a signal related to the at least one electronic component, wherein the device substrate includes at least one conductive contact disposed at a position corresponding to the at least one first conductive pad and the at least one second conductive pad, and wherein the at least one conductive contact contacts with the at least one first conductive pad and the at least one second conductive pad when the connection substrate faces the device substrate.

* * * * *